United States Patent [19]

Pemberton

[11] 4,068,959
[45] Jan. 17, 1978

[54] COUPLER APPARATUS

[76] Inventor: Bruce W. Pemberton, No. 314, Lake Howell Arms Apartments, Casselberry, Fla. 32707

[21] Appl. No.: 745,063

[22] Filed: Nov. 26, 1976

[51] Int. Cl.² .................. F16D 1/00; F16L 17/00; F16L 29/00
[52] U.S. Cl. ............... 403/15; 214/145 A; 172/273; 403/31; 403/322
[58] Field of Search .......... 403/15, 31, 322, 33, 403/34; 214/145 A

[56] References Cited

U.S. PATENT DOCUMENTS

| 3,608,930 | 9/1971 | Moriceau | 37/103 |
| 3,760,883 | 9/1973 | Birk | 214/145 A |
| 3,818,551 | 6/1974 | Coughran | 214/145 A |

FOREIGN PATENT DOCUMENTS 814,808  5/1966  Canada .................. 214/145 A

Primary Examiner—Wayne L. Shedd
Attorney, Agent, or Firm—Duckworth, Hobby & Allen

[57] ABSTRACT

A quick-hitch type coupler for front end loaders, and the like, for attaching various attachments to the front end loader without having to leave the vehicle. The lift mechanism of a front end loader has a coupler connecting and locking portion attached thereto, and each attachment for the loader has pairs of coupling brackets attached thereto, so that the front end loader lifting mechanism can be coupled or uncoupled from the attachment, and locked to it by the actuating of a single cylinder.

10 Claims, 4 Drawing Figures

COUPLER APPARATUS

BACKGROUND OF THE INVENTION

The present invention relates to coupling mechanisms for vehicles, and especially to quick-connecting type couplers for front end loaders and similar vehicles.

In the past, a great variety of companies have provided front end loaders, operating on both wheels and tracks, which in a typical case, has a lifting mechanism driven by a hydraulic cylinder, operated by the operator driving the vehicle. The lifting mechanism may have a bucket attached thereto for filling with gravel or other material for movement from one location to another. However, front end loaders typically have a variety of attachments that can be used in place of a bucket. These might include a logfork attachment, for lifting and moving logs, and other stacked material adapted to fit onto a pair of protruding lift arms. In practice, it becomes desirable to be able to shift from one attachment to another as quickly as possible without the operator having to spend a great deal of time disconnecting one attachment and attaching and locking another one in place.

It has been suggested in the past to have coupling mechanisms which can couple an attachment to the lift mechanism of the front end loader, without the operator leaving the vehicle. Similarly, the attachment can be disconnected generally by reversing the procedure. The attachment needs to be not only quick, but sufficiently secure so as to support the heavy load that a front end loader is subjected to. In a typical case, a front end loader with a bucket is used in digging into the earth and hauling dirt and gravel in large quantities, and the bucket may take a substantial beating without the coupling loosening or breaking. The present invention advantageously provides a quick-hitch type coupler which allows the operator to attach and disengage attachments for front end loaders, in a rapid and secure manner, but without the precise alignment necessary for coupling such mechanisms; and in a simplified manner, thereby reducing the cost of manufacture and maintenance.

SUMMARY OF THE INVENTION

A quick-hitch coupler mechanism for front end loaders and similar vehicles is provided having a coupling and locking portion attached to the vehicle lift mechanism having a frame and fixed attachment engagement members for engaging and lifting an attachment for the front end loader and a pair of movable locking members may be actuated by the operator for the locking of the attachment to the vehicle. A hydraulic cylinder is connected to the framework for driving the locking members from a first unlocked position to a second locked position. Brackets are provided for connecting to the attachment for the front end loader, which includes a pair of upper brackets and a pair of lower brackets so that the fixed attachment engaging members engage the upper brackets while the locking members are driven by the hydraulic cylinder into the lower brackets for locking the attachment to the lifting mechanism on the front end loader. The upper and lower brackets are generally U-shaped and an upper and lower bracket may be connected to form pairs of brackets. The movable locking members are connected to each other by a cross member, and extend through slots in the frame and are further guided by guides riding in the tracks, so that actuating the hydraulic cylinder slides the members back and forth in the slots.

BRIEF DESCRIPTION OF THE DRAWINGS

Other objects, features and advantages of the present invention will be apparent from the written description and the drawings in which.

DESCRIPTION OF THE PREFERRED EMBODIMENT

Figure 1:
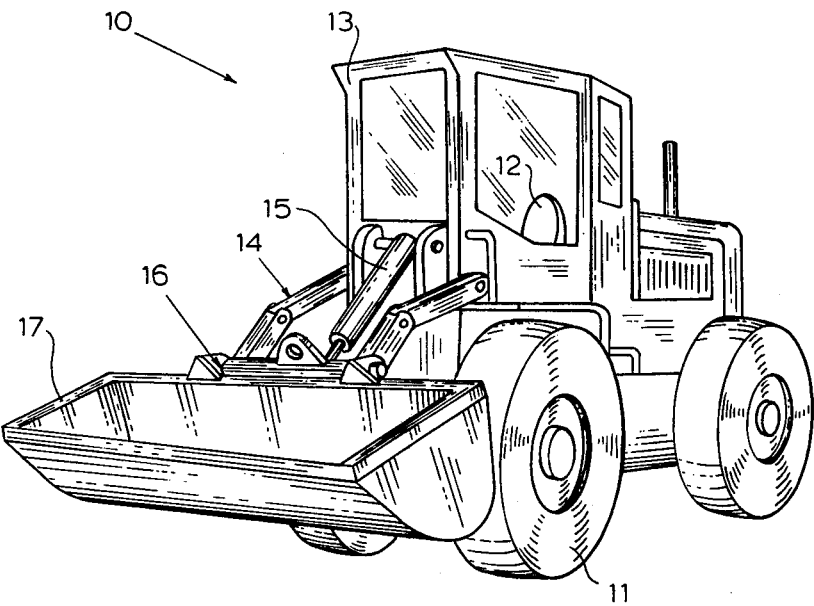
FIG. 1 is a perspective view of a front end loader having a bucket attachment attached thereto.
Figure 2:
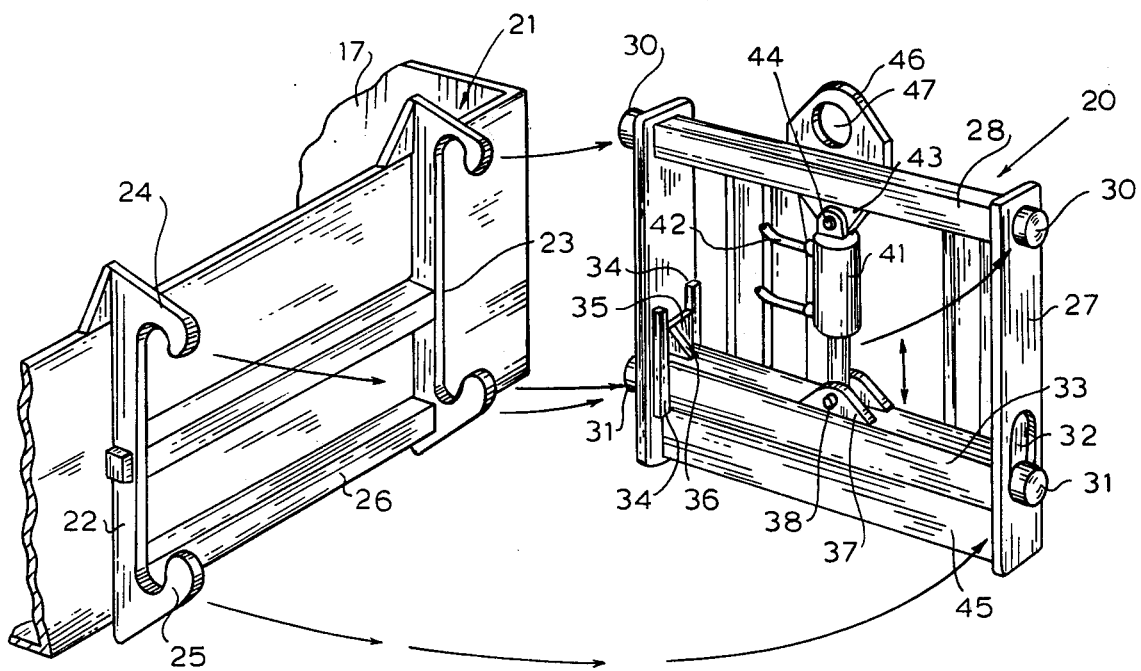
FIG. 2 is a perspective view of a coupler mechanism in accordance with the present invention having the bucket of FIG. 1 disconnected.
Figure 3:
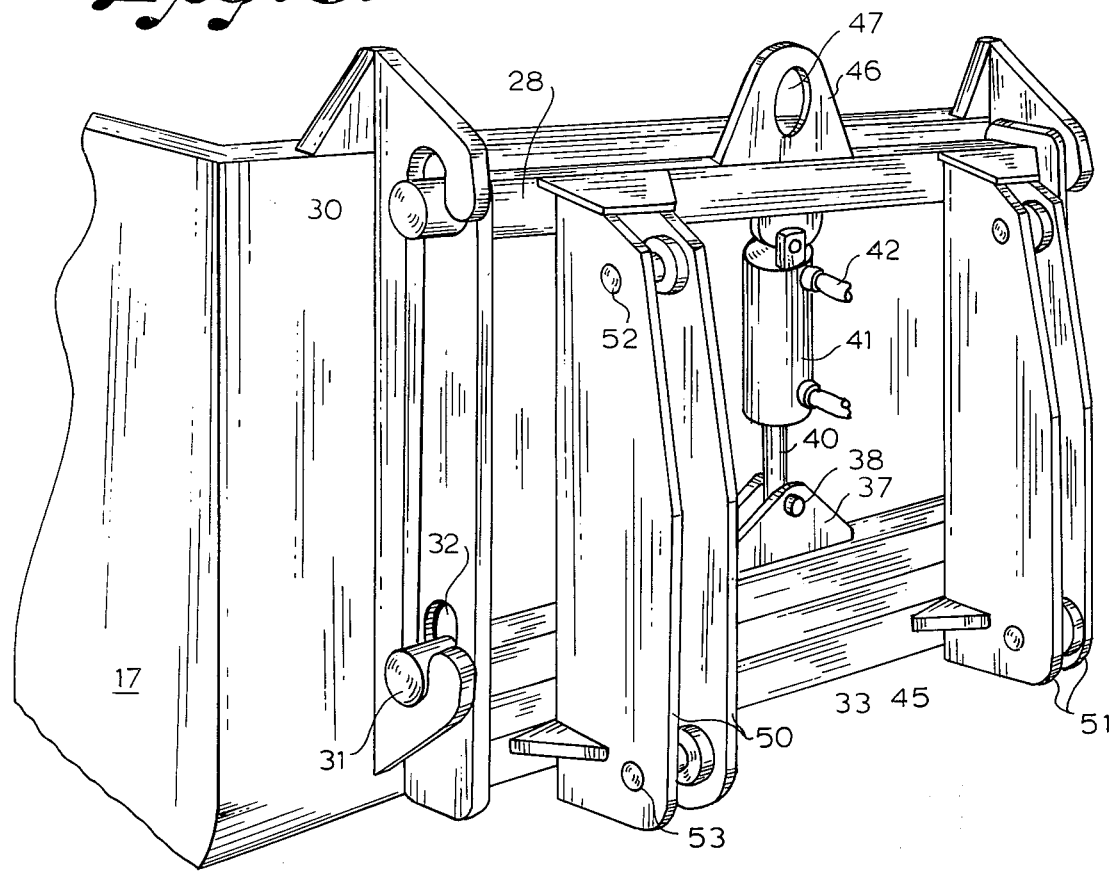
FIG. 3 is a perspective view of the coupling mechanism having a bucket attachment locked thereto.
Figure 4:
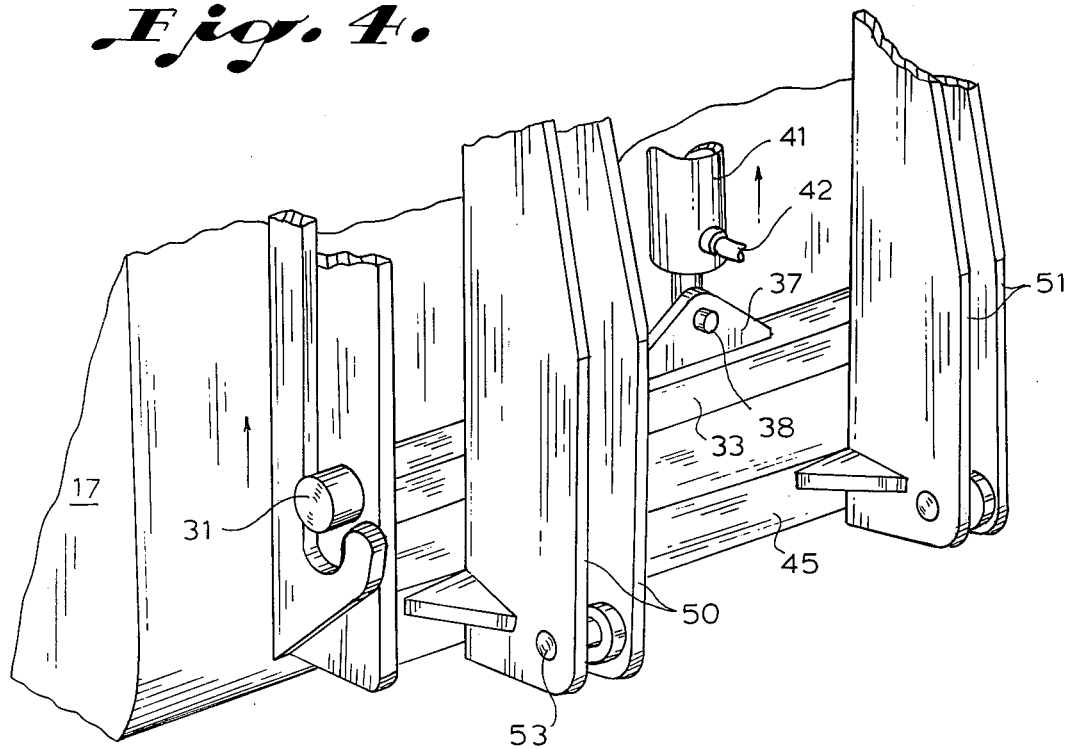
FIG. 4 is a cut-away perspective view of a coupler unlocking the bucket attachment

Referring now to the drawings, FIG. 1 has a front end loader 10 having wheels 11 and an operator's seat 12 therein along with a protective framework 13. The front end loader has a lifting mechanism 14 attached thereto and actuated by a hydraulic cylinder 15 which may be operated by an operator from the operator's seat 12. The mechanism 14 has a linkage which connects to the coupler mechanism 16 of the present invention which is shown connecting a bucket 17 to the front end loader 10 in FIGS. 2-4. The operation of the coupler mechanism is more clearly illustrated in which a male master-coupler portion 20 has the standard connection for a front end loader, while the female portion 21 is readily attachable to any front end loader attachment such as the bucket 17. The female portion 21 has a pair of brackets 22 and 23, each having an upper bracket 24 and lower bracket 25 which is generally U-shaped. Brackets 22 and 23 are attached to the attachments for a front end loader, and in case of a bucket attachment, a pair of cross brace members 26 connect the brackets 22 and 23 together. It will, of course, be clear that the upper brackets 24 and lower brackets 25 do not have to be connected even though this is the preferred embodiment, which avoids alignment problems between the two. The male portion 20 of the coupler, has side frame members 27 along with a cross-frame member 28 connecting the frame members 27 together, and a pair of protruding, cylindrical-shaped, fixed, attachment members 30, which are designed to be coupled into the upper brackets 24 of the brackets 22 and 23 with the frame members 27 located inside the brackets 22 and 23 to prevent side-to-side movement. Once the members 30 are in position, the lift mechanism 14 of the front end loader 10 of FIG. 1 can be lifted, which results in the attachment 17 swinging down so that a pair of cylindrical movable and lockable members 31 will brace against the connecting portion between the brackets 24 and 25 and can be actuated to move into the brackets 25 to lock the male master portion 20 to the female portion 21 of the coupler mechanism. The movable, locking members 31 pass through and are supported by slots 32, and are connected to each other by a transverse, frame member 33 which actually forms a part of the movable, locking members 31. In addition, the frame 27 has a pair of guide rails 34 attached therein for guiding a guide member 35 which is attached to the transverse member 33, such as by welding, to further guide the movement of the transverse member 33 between a first unlocked position (as illustrated in FIG. 4) and a second locked position (as illustrated in FIG. 3). The guides 35 may have bracing members 36 for additional support. The transverse member of 33 also has journal brackets 37 having a pin 38 journalled therethrough for connecting to a hydraulic cylinder rod 40 driven by a hydraulic cylinder 41 which is in turn, driven by a pair of hydraulic cylinder lines 42, which can be operated by the operator in the seat 12 of FIG. 1 of the front end loader 10. Hydraulic cylinder 41 is connected to journal brackets 43 by a journal pin 44 with the brackets 43 being attached to the cross-brace members 28, and additional bottom cross-brace members 45 further strengthens the male master portion of the coupler mechanism. In addition, the male master 16 has the protruding portion 46 with an opening 47 along with the rear front end loader coupling portion 50 and 51 having upper openings 52 and lower openings 53, which are part of the standard connections for front end loaders. This facilitates the attachment of the male portion to the lift mechanism of the front end loader, by the removal and attachment thereto with standard bucket pins. Thus, the installation is designed so that a front end loader bucket can be disconnected, the male master portion 16 attached with standard, bucket pins, then flexible hoses can be installed on the inside of the boom arms of the front end loader down to the quick-hitch hydraulic cylinder 42, and an aligned locking valve can be installed to prevent the loss of pressure in the hydraulic cylinder 41 because of failure in the hydraulic pressure. In operation, the attached coupler, attached to the front end loader, is actuated by actuating the hydraulic system to raise the power rod 40 into the hydraulic cylinder 41 lifting the locking members 31. The front end loader may then be driven by the operator to direct the fixed attachment engaging members 30 into the upper brackets 24 of the brackets 22 and 23. Then, raising the lift mechanism 14 of the front end loader of FIG. 1, while the buckets 17 and brackets 22 and 23 swing up onto the coupler 16, so that the locking members 31 engage the brackets 22 and 23. The hydraulic cylinder 41 may then be actuated to extend the rod 40, driving the transverse locking member 33 and locking pins 31 into the brackets 25 on both the brackets 22 and 23 to lock the brackets 22 and 23 to the male portion 16 between the pins 30 and 31. Side to side movement is prevented by the frame members 27 of the male master 16 being located inside the female brackets 22 and 23.

It should be clear at this point that a coupling mechanism for front end loaders has been illustrated, but it should also be clear that the present coupling mechanism is adapted for use with other types of vehicles, including front end loaders with tracks rather than wheels 11. Accordingly, the present invention is not to be construed as limited to the particular forms herein, which are to be considered illustrative rather than restrictive.

I claim:

1. A coupling mechanism for front end loaders and the like, comprising in combination:
vehicle attaching portion having a frame, and a pair of fixed attachment engaging members said frame having two side frame members, each having at least one slot therein connected together by a transverse member and being movably connected to said frame;
a pair of movable locking members movably connected to said frame, each movable locking member extending through a slot in one side frame member for sliding therein;
a fluid cylinder connected between said frame and said movable locking members for moving said movable locking members from a first unlocked position to a second locked position;
attachment connecting portion, having a pair of upper brackets connectable to an attachment for a vehicle, and shaped to receive said fixed attachment engaging members of said vehicle attachable portion;
a pair of lower brackets connectable to an attachment for a vehicle and shaped to receive said movable locking members for locking said attachment to said vehicle upon actuation of said movable locking members when said attachment is supported by said fixed, attachment engaging members in said upper brackets;
at least one guide member connected to said movable locking member transverse member; and
at least one track attached to said frame and positioned to guide one said guide member for guiding the movement of said movable locking members in said slots in said side frame members.

2. The apparatus in accordance with claim 1, in which said pair of fixed attachment engaging members are cylindrically shaped members attached to said side frame members.

3. The apparatus in accordance with claim 1, in which each said upper bracket is attached to one said lower bracket, with an elongated connecting portion.

4. The apparatus in accordance with claim 3, in which each said upper bracket is U-shaped with one arm of said "U" forming the connecting member between each upper and lower bracket.

5. The apparatus in accordance with claim 4, in which each said lower bracket is U-shaped with one arm of said "U" connecting with one arm of the "U" of said upper bracket, to form the connection therebetween.

6. The apparatus in accordance with claim 5, in which a pair of connected upper and lower brackets are connected by transverse members.

7. The apparatus in accordance with claim 6, in which said fluid cylinder is a hydraulic cylinder, attached to a cross-frame member of said vehicle portion frame.

8. The apparatus in accordance with claim 1, in which each said transverse frame member, attached to said movable, locking members, has a pair of guide members, one located to follow guide rails on each side frame member.

9. The apparatus in accordance with claim 1, in which said hydraulic cylinder is connected to said transverse, cross member by a pin journalled to said transverse frame member.

10. The apparatus in accordance with claim 1, in which said hydraulic cylinder has a releaseable check valve, connected in the hydraulic line, to prevent the release of pressure in the hydraulic cylinder upon the loss of pressure in said hydraulic lines.

* * * * *